United States Patent
Rivas et al.

(10) Patent No.: US 7,037,961 B2
(45) Date of Patent: May 2, 2006

(54) METHOD FOR PREPARATION OF ASPHALT COMPOSITION

(75) Inventors: Hercilio Rivas, Sta Fe Norte Caracas (VE); Pedro Blanco, Los Teques (VE)

(73) Assignee: Intevep, S.A., Caracas (VE)

( * ) Notice: Subject to any disclaimer, the term of this patent is extended or adjusted under 35 U.S.C. 154(b) by 0 days.

(21) Appl. No.: 10/658,891

(22) Filed: Sep. 9, 2003

(65) Prior Publication Data

US 2005/0051055 A1    Mar. 10, 2005

(51) Int. Cl.
*C08L 95/00* (2006.01)
(52) U.S. Cl. ........................................................ 524/62
(58) Field of Classification Search ................ 106/274, 106/278; 524/62, 68, 71
See application file for complete search history.

(56) References Cited

U.S. PATENT DOCUMENTS

| 4,130,516 A | 12/1978 | Gagle et al. |
| 4,283,231 A * | 8/1981 | Clementoni et al. ........ 106/274 |
| 4,818,367 A | 4/1989 | Winkler |
| 5,672,642 A | 9/1997 | Gros |
| 5,773,496 A | 6/1998 | Grubba |
| 6,074,469 A | 6/2000 | Collins et al. |
| 6,133,351 A | 10/2000 | Hayner |

FOREIGN PATENT DOCUMENTS

| DE | 3630132 A1 | 4/1986 |
| DE | 289052 A5 | 4/1991 |
| DE | 289056 A5 | 4/1991 |
| DE | 4034319 A1 | 5/1991 |
| EP | 0174795 A2 | 3/1986 |
| FR | 2533935 A1 | 4/1984 |

* cited by examiner

*Primary Examiner*—Peter Szekely
(74) *Attorney, Agent, or Firm*—Bachman & LaPointe, P.C.

(57) ABSTRACT

A method for preparing an asphalt composition includes the steps of providing asphalt; mixing sulfur with the asphalt at a temperature greater than 200° C. to provide a sulfur-asphalt blend; providing a heavy aromatic oil; and mixing the heavy aromatic oil with the sulfur-asphalt blend to provide the asphalt composition. Polymers can also advantageously be incorporated into the asphalt composition.

17 Claims, 1 Drawing Sheet

METHOD FOR PREPARATION OF ASPHALT COMPOSITION

BACKGROUND OF THE INVENTION

The invention relates to asphalt compositions and, more particularly, to a method for preparing an asphalt compositions which has good performance characteristics within a given temperature range.

Asphalt compositions are used in various applications, one predominant application of which is the paving industry. During normal use, pavement tends to show several distresses, including temperature induced permanent deformation or rutting, low temperature-induced thermal cracking, load associated fatigue cracking and chemical aging or hardening.

Growing traffic and higher axial loads of vehicles accelerate this road damage.

In an attempt to address these problems, polymers have been added to the asphalt. Unfortunately, compatibility of the polymer and effective incorporation of the polymer into the asphalt, as well as stability of the asphalt composition prior to use, remain issues with known methods.

In order to obtain dispersion of the typically solid polymer through the asphalt, a high shear mixing is required. Even with such high shear mixing, the dispersion so obtained is unstable.

Vulcanizing agents such as sulfur have also been used in asphalt compositions. Although various methods of incorporating sulfur into the asphalt composition have been attempted, problems experienced include the generation of $H_2S$ gases at temperatures above certain levels, the need for high shear mixing equipment, and persistent phase separation.

Attempts to incorporate sulfur into pavement during pavement construction result in sulfur incorporated as an aggregate, and not as a component of the asphalt itself. Thus, problems remain in connection with suitable incorporation of sulfur into the asphalt composition as well.

Based upon the foregoing, it is clear that the need remains for an improved method for preparation of an asphalt composition whereby polymers and/or sulfur can effectively be incorporated into the asphalt composition.

It is therefore the primary object of the present invention to provide such a method.

It is a further object of the present invention to provide such a method wherein the resulting asphalt composition is stable under asphalt storing conditions.

It is still another object of the present invention to provide such a composition wherein effective dispersion of the ingredients added to the asphalt results in a final product having desirable characteristics in connection with resistance to rutting, low temperature cracking, fatigue cracking and chemical aging or hardening.

Other objects and advantages of the present invention will appear hereinbelow.

SUMMARY OF THE INVENTION

In accordance with the present invention, the foregoing objects and advantages have been readily attained.

According to the invention, a method is provided for preparing an asphalt composition, which method comprises the steps of providing an asphalt; mixing sulfur with said asphalt at a temperature greater than 200° C. to provide a sulfur-asphalt blend; providing a heavy aromatic oil; and mixing said heavy aromatic oil with said sulfur-asphalt blend to provide said asphalt composition.

In further accordance with the invention, another method for preparation of an asphalt composition has been provided, which comprises the steps of providing an asphalt; mixing sulfur with said asphalt to provide a sulfur-asphalt blend; providing a heavy aromatic oil; mixing said heavy aromatic oil with a polymer to provide an oil-polymer blend; and mixing said oil-polymer blend with said sulfur-asphalt blend to provide said asphalt composition.

BRIEF DESCRIPTION OF THE DRAWINGS

A detailed description of preferred embodiments of the present invention follows, with reference to the attached drawing, wherein.

DETAILED DESCRIPTION

Figure 1:
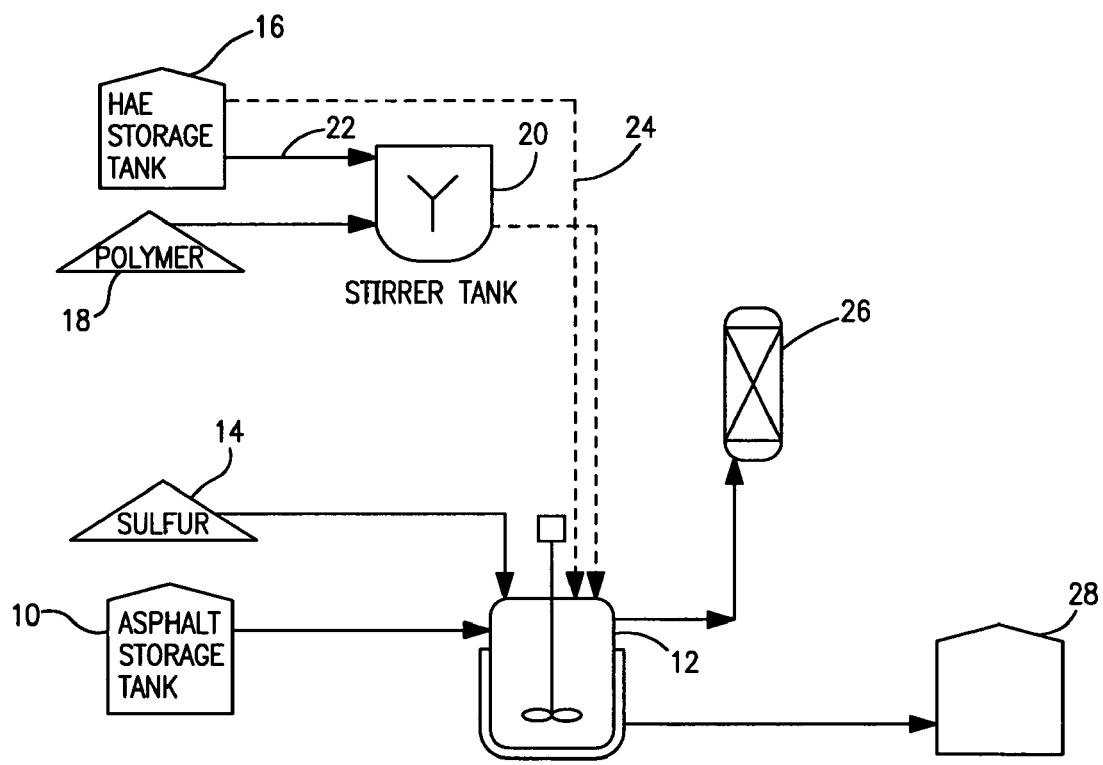
FIG. 1 schematically illustrates a system for carrying out the method in accordance with the present invention.

The invention relates to a method for preparing an asphalt composition and, more particularly, to a method whereby sulfur, and preferably polymer, are dispersed through ingredients of the asphalt composition so as provide a final asphalt composition product which has desirable properties.

The asphalt composition of the present invention is formed from basic asphalt, a hydrocarbon which is typically a heavy aromatic extract, sulfur and, preferably, a polymer.

According to the invention, a method for making the composition is provided which involves mixing certain ingredients under certain conditions and in a certain order whereby the resulting composition has desirable properties.

The asphalt in question is selected to provide desirable rheological, mechanical and adhesivity properties for use in pavement industry. Suitable asphalt can be obtained through techniques known to a person of ordinary skill in the art. One example of suitable asphalt is asphalt obtained through distillation of crude such as Venezuelan Boscan crude, for example having a grade PG67-22.

The heavy aromatic extract component is provided to enhance the compatibility between the asphalt and the polymer. This extract has further been found in accordance with the present invention to increase the amount of sulfur that can be incorporated into the system. The heavy aromatic extract does not significantly affect asphalt properties, although decrease in viscosity is observed. Suitable heavy aromatic extracts are also known to a person of ordinary skill in the art. Suitable heavy aromatic extract in accordance with the present invention may have varied properties, such as a viscosity of about 53,000 centipoise at a temperature of about 30° C. Typically, such extract does not flow at room temperature.

The polymer component, which may preferably be incorporated into the asphalt composition is selected to increase viscosity of the asphalt composition without making the composition too rigid. This allows excellent fatigue resistance. The polymer is further adapted to provide such increased viscosity without making the final composition too brittle, which provides excellent resistance to different thermal cycles. Various polymers are also known to a person of ordinary skill in the art as desirable for incorporation into an asphalt composition. One example of a particularly preferred polymer is SBS polymer, or SBS co-polymer.

The sulfur to be incorporated into the asphalt composition in accordance with the present invention is desirable as it helps to increase incorporation of the heavy aromatic extract component without significantly affecting the permanent deformation resistance at high temperatures which is possessed by the final asphalt composition. The sulfur component further serves to improve rheological properties of the asphalt, such as fatigue, flexibility and permanent deformation resistance at high temperatures. When used in connection with the polymer additive, sulfur also serves to help reduce the amount of polymer needed to obtain desirable product characteristics.

As set forth above, the method of the present invention provides an asphalt composition having desirable stability and rheology characteristics.

In this regard, stability as used herein refers to storage stability and relates to an asphalt composition having a viscosity which does not substantially increase during storage at 163° C. Stability is further evidenced by lack of settling, skinning or gelation, or other signs of phase separation.

Typical tests for determining asphalt stability involve pouring of the asphalt composition into a glass test tube, placing the test tube in a vertical position in an oven for 72 hours at 160° C.±1° C., and after cooling, cutting the tubes in three sections. Samples are taken from the top and bottom portions, and are reheated for rheology and Ring & Ball (R&B) softening point tests. R&B softening point can be determined according to ASTM D 36.

Rheology as referred to herein relates to the rheological properties of the asphalt composition. Rheological properties are tested for example using an ARES 7000-02655 Rheometrics Dynamic Rheometer using parallel plates. The samples are cooled in a freezer. The plate diameter used can, for example, be 25 mm. All tests are preferably carried out at least twice in order to assure repeatability of the results. Various parameters can then be determined which are indicative of good performance. Turning now to FIG. 1, the method of the present invention will be further described.

FIG. 1 shows a system and illustration of the method in accordance with the present invention, and shows a storage tank 10 for asphalt which represents the source of asphalt for the process of the present invention. As shown, asphalt is fed to a mixer 12, which is preferably a semi-continuous reactor having a source of heat, for example in a jacketed heat-transfer configuration. Sulfur 14 is also fed from a suitable source to mixer 12, and the mixing of asphalt and sulfur is carried out at a temperature and for a time and under other mixing conditions suitable to form a substantially homogeneous distribution of the sulfur through the asphalt.

In this regard, this mixing step is preferably carried out at a temperature greater than 200° C. more preferably at a temperature between about 220° and about 270° C., and most preferably at a temperature of about 250° C. At such a mixing temperature, the sulfur can quickly react with the asphalt as desired so as to be incorporated into the asphalt and provide the desired sulfur-asphalt blend. Further, in accordance with the present invention, mixing at this temperature and with sulfur in an amount between about 0.8 and about 10% wt., based upon weight of the sulfur-asphalt blend, has been found to result in a suitable reaction and dispersion of sulfur through the asphalt without generation of substantial amounts of $H_2S$ gas and the like.

The sulfur provided can be any type of elemental sulfur, in solid or liquid form, or can be a sulfur precursor provided that the byproduct is not a component detrimental to the final asphalt composition.

Still referring to FIG. 1, the heavy aromatic extract is also provided from a storage tank 16 or other suitable source thereof, and may advantageously be mixed with polymer from a suitable polymer source 18, for example in a stirred tank 20. In the broadest aspect of the present invention, polymer is not incorporated into the asphalt composition. In such a case, heavy aromatic extract is mixed with the sulfur-asphalt blend and provides for a desirable final product.

When, however, polymer is to be incorporated in accordance with the preferred embodiment of the present invention, it is preferred that the mixing step, in this example carried out in tank 20, be conducted out with the heavy aromatic oil heated to a temperature of about 200° C. At such a temperature, the copolymer can be added in desirable amounts, preferably up to about 30% wt. based upon total weight of the polymer-oil blend, and mixing at relatively low shear for a period of between about 60 and about 180 minutes is suitable for dispersion of the polymer through the oil, for example to the point where solid particles cannot be seen by the naked eye.

Still referring to FIG. 1, the polymer-oil blend is then also fed to mixer 12 for mixing with the sulfur-asphalt blend. In this regard, prior to mixing with the polymer-oil blend it is preferred to cool the sulfur-asphalt blend, or allow the sulfur-asphalt blend to cool, to a temperature which is less than or equal to about 200° C. This serves to ensure that polymer incorporated in the polymer-oil blend does not break down or degrade due to excessive temperature. Mixing is preferably carried out using between about 10% and about 30% wt. of the polymer-oil blend based upon weight of the final asphalt composition, and a suitable final product is obtained by stirring for a time sufficient in order to achieve dispersion of the polymer into the asphalt blend and, further, to preferably obtain a substantially homogenous blend. Mixing in a typical mixer for a period of between about 30 and about 120 minutes is typically sufficient.

As shown in FIG. 1, polymer can be mixed with only a portion 22 of heavy aromatic oil from source 16, with another portion 24 being fed directly to mixer 12.

Further, a caustic scrubber 26 may advantageously be associated with mixer 12 for use in well known fashion to remove undesirable components and the like from mixer 12. Final composition 28 is schematically illustrated in FIG. 1, and represents an asphalt composition having excellent storage properties, and further having excellent properties when employed in formation of a pavement structure, including resistance to high temperature deformation, low temperature cracking, load associated fatigue cracking and chemical aging or hardening and the like.

The following examples demonstrate preparation of asphalt composition in accordance with the present invention. As will be demonstrated therein, suitable compositions can be prepared according to the invention which incorporate sulfur without substantial generation of $H_2S$ gases. Further, these methods advantageously and effectively disperse the polymer additive through the composition without excessive shear, to provide a final composition having the aforesaid desired properties.

EXAMPLE 1

The base asphalt-sulfur was prepared using 99.2% wt of an asphalt obtained by distillation of Venezuelan Boscán crude, with a grade PG 67-22. The asphalt was mixed with 0.8% wt elemental sulfur at 250° C. The mixture was stirred for 90 minutes at 400 RPM.

A polymer rich blend was prepared by mixing 75% wt heavy aromatic extract with 25% wt SBS polymer at 200° C. The mixture was stirred in a paddle mixing tank at 400 RPM for 150 min.

The polymer rich blend was added to the asphalt-sulfur mixture. The final formulation was 7.5% Heavy Aromatic Extract, 2.5% SBS, 0.8% sulfur and 89.2% asphalt all by weight.

Properties and characteristics of the starting materials used are described in tables 1–4 below.

TABLE 1

Physical-chemical properties of Boscan Asphalt

| ASPHALT | Penetration (1/10 mm) | Absolute Viscosity (poise) | Ring & Ball, softening point (° C.) |
|---|---|---|---|
| PG 67–22 | 66 | 3286 | 49.4 |

TABLE 2

SBS Copolymer Characteristics

| Polymer | Styrene/ Butadiene | Molecular Weight | Structure | Coupling efficiency |
|---|---|---|---|---|
| Enichem T 6302E | 30/70 | 115000 | linear | 90% |

TABLE 3

Viscosity of the heavy aromatic extract used to formulate the SBS copolymer Dispersion

| STREAM | Temperature (° C.) | Viscosity (centipoise) |
|---|---|---|
| Heavy Aromatic Extract | 30° C.* | 53,090 |

*Heavy Aromatic extract does not flow at room temperature.

TABLE 4

Elemental Sulfur Physical Properties

| Melting Point (° C.) | 115.21 |
|---|---|
| Boiling Point (° C.) | 444.72 |
| Critical Temperature (° C.) | 1041 |
| Crystal | Rhombic, Monoclinic, Polysulfur (Not stable) |
| Density | Liquid ≈ 2 |

Stability and complete SHRP evaluation was performed on the product obtained. Table 5 summarizes results of the modified asphalt composition storage stability tests and SHRP evaluation.

TABLE 5

SHRP and stability results

| Absolute Viscosity (P) - ASTM D-2171 | | 15449 | |
|---|---|---|---|
| Mass Change (% w/w) - RTFOT - ASTM D-2872 | | −0.287 | |
| STABILITY TEST | | Top | Bottom |
| Ring & Ball, Softening Point (° C.) | | 71.9 | 73.9 |
| | 70° C. | 76° C. | 82° C. |
| Virgin Asphalt (Tank) | | | |
| G*/sin(delta) Min 1.00 kPa AASHTO TP5 | 2.53 | 1.26 | 0.75 |
| Limiting Temperature (° C.) RTFOT | | 79.4 | |
| G*/sin(delta) Min 2.20 kPa AASHTO TP5 | 4.48 | 2.42 | 1.27 |
| Limiting Temperature (° C.) | | 76.8 | |
| PAV - AASHTO PP1 | 7° C. | 10° C. | 13° C. |
| G*.sin(delta) Max. 5000 kPa AASHTO TP5 | 6094.8 | 4251.7 | 3689.6 |
| Limiting Temperature (° C.) | | 7.0 | |
| BBR after PAV | −12° C. | −18° C. | −24° C. |
| S max. 300 MPa AASHTO TP1 | 51.6 | 205 | 181.0 |
| Limiting Temperature (° C.) | | −28.9 | |
| m Min. 0.3 AASHTO TP1 | 0.320 | 0.308 | 0.278 |
| Limiting Temperature (° C.) | | 18 | |
| PG GRADE | | 76–28 | |
| REAL GRADE | | 79–28 | |

The composition formed in accordance with this example, as set forth above, has excellent characteristics in connection with stability and for use as a pavement.

EXAMPLE 2

The base asphalt-sulfur was prepared using 93% wt asphalt obtained by distillation of Venezuelan Boscán crude, with a grade PG 58-28. The asphalt was mixed with 7% wt elemental sulfur at 250° C. The mixture was stirred for 90 minutes at 400 RPM.

Heavy aromatic extract was added to the asphalt-sulfur mixture. The final blend was stirred for 60 min. at 250° C.

The final formulation was 27.27% wt Heavy Aromatic Extract, 5.09% wt sulfur and 67.64% wt asphalt.

The sulfur and the aromatic extract used have the same characteristics as set forth in Example 1. Starting asphalt properties are set forth in the Table 6.

TABLE 6

Physical-chemical properties of the Boscan Asphalt used.

| ASPHALT | Penetration (1/10 mm) | Absolute Viscosity (poise) | Ring & Ball, softening point (° C.) |
|---|---|---|---|
| PG 58–28 | 180 | 1057 | 38.1 |

Results obtained from stability and SHRP testing are set forth in Table 7.

TABLE 7

Stability and SHRP results.

| | | | |
|---|---|---|---|
| Absolute Viscosity (P) - ASTM D-2171 | | 10695 | |
| Mass Change (% w/w) - RTFOT - ASTM D-2872 | | −0.353 | |
| STABILITY TEST | Top | | Bottom |
| Ring & Ball, Softening Point (° C.) | 60.4 | | 60.2 |
| Virgin Asphalt (Tank) | 64° C. | 70° C. | 76° C. |
| G*/sin(delta) Min 1.00 kPa AASHTO TP5 | 3.06 | 1.49 | 0.87 |
| Limiting Temperature (° C.) | | 74.1 | |
| RTFOT | 70° C. | 76° C. | 82° C. |
| G*/sin(delta) Min 2.20 kPa AASHTO TP5 | 9.10 | 5.59 | 3.35 |
| Limiting Temperature (° C.) | | 83.8 | |
| PAV - AASHTO PP1 | 7° C. | 10° C. | 13° C. |
| G*.sin(delta) Max. 5000 kPa AASHTO TP5 | 4924.8 | 3815.9 | 2975.4 |
| Limiting Temperature (° C.) | | 6.7 | |
| BBR after PAV | −6° C. | −12° C. | −18° C. |
| S max. 300 MPa AASHTO TP1 | 26.1 | 44.1 | 76.4 |
| Limiting Temperature (° C.) | | 33.3 | |
| M Min. 0.3 AASHTO TP1 | 0.325 | 0.321 | 0.276 |
| Limiting Temperature (° C.) | | −13.5 | |
| PG GRADE | | 70–22 | |
| REAL GRADE | | 74–23 | |

In this example, increased sulfur was used as compared to Example 1, which allowed for incorporation of additional heavy aromatic extract, and which reduced the amount of polymer desired to provide excellent characteristics.

EXAMPLE 3

The base asphalt-sulfur was prepared using 93% wt of asphalt obtained by distillation of Venezuelan Boscán crude, with a grade PG 58-28. The asphalt was mixed with 7% wt elemental sulfur at 250° C. The mixture was stirred for 90 minutes at 400 RPM, letting the sulfur react completely.

A blend was prepared by mixing 95% wt heavy aromatic extract with 5% wt SBS polymer at 200° C. The mixture was stirred in a paddle mixing tank at 400 RPM for 90 min. The polymer rich blend was added to the asphalt-sulfur mixture. The final formulation was 26% wt Heavy Aromatic Extract, 1.27% wt SBS, 5.09% wt sulfur and 67.64% asphalt.

The physical properties and characteristic of the starting materials are the same as those in Example 1.

The results obtained from stability testing and the SHRP evaluation is summarized in Table 8.

TABLE 8

Stability and SHRP results.

| | | | |
|---|---|---|---|
| Absolute Viscosity (P) - ASTM D-2171 | | 18267 | |
| Mass Change (% w/w) - RTFOT - ASTM D-2872 | | −0.233 | |
| Rotational Viscosity @ 135° C. (Pas) - ASTM D-4402 | | 0.992 | |
| Virgin Asphalt (Tank) | 70° C. | 76° C. | 82° C. |
| G*/sin(delta) Min 1.00 kPa AASHTO TP5 | 2.6 | 1.3 | 0.7 |
| Limiting Temperature (° C.) | | −79.4 | |
| RTFOT | 76° C. | 82° C. | 88° C. |
| G*/sin(delta) Min 2.20 kPa AASHTO TP5 | 4.5 | 2.5 | 1.3 |
| Limiting Temperature (° C.) | | 82.8 | |
| PAV - AASHTO PP1 | 7° C. | 10° C. | 13° C. |
| G*.sin(delta) Max. 5000 kPa AASHTO TP5 | 5094.8 | 3456.7 | 2389.6 |
| Limiting Temperature (° C.) | | 7.0 | |
| BBR after PAV | −12° C. | −18° C. | −24° C. |
| S max. 300 MPa AASHTO TP1 | 51.6 | 95.7 | 181.0 |
| Limiting Temperature (° C.) | | −28.9 | |
| m Min. 0.3 AASHTO TP1 | 0.314 | 0.305 | 0.275 |
| Limiting Temperature (° C.) | | 18 | |
| PG GRADE | | 76–28 (Limit) | |
| REAL GRADE | | 79–28 | |

It should be appreciated that the method in accordance with the present invention allows preparation of asphalt compositions having desirable qualities for use as a pavement, as well as in storage. Further, complete polymer dispersion, when polymer is required, is accomplished under low shear conditions.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for preparing an asphalt composition, comprising the steps of:
    providing an asphalt;
    mixing sulfur with said asphalt at a temperature greater than 200° C. to provide a sulfur-asphalt blend;
    providing a heavy aromatic oil;
    providing a polymer additive and mixing said polymer additive with said heavy aromatic oil to provide an oil-polymer blend; and
    mixing said oil-polymer blend with said sulfur-asphalt blend to provide said asphalt composition.

2. The method of claim 1, further comprising cooling said sulfur-asphalt blend to a temperature less than or equal to 200° C. before mixing with said oil-polymer blend.

3. The method of claim 1, wherein said polymer is mixed with said heavy aromatic oil in an amount up to about 30% wt. based upon weight of said oil-polymer blend.

4. The method of claim 1, wherein said oil-polymer blend is mixed with said sulfur-asphalt blend in an amount between about 10% and about 30% wt. based upon weight of said asphalt composition.

5. The method of claim 1, wherein said step of mixing said oil-polymer blend with said sulfur-asphalt blend is carried out for a period of time sufficient to provide a substantially homogeneous dispersion of said polymer additive in said sulfur-asphalt blend.

6. The method of claim 1, wherein said polymer is SBS polymer.

7. The method of claim 1, wherein said sulfur is mixed with said asphalt in an amount between about 0.8% and about 10% wt based upon weight of said sulfur-asphalt blend.

8. The method of claim 1, further comprising the step of heating said asphalt to a temperature of between about 220° C. and about 270° C. to provide a heated asphalt, and mixing said sulfur with said heated asphalt.

9. A method for preparing an asphalt composition, comprising the steps of:
providing an asphalt;
mixing sulfur with said asphalt to provide a sulfur-asphalt blend;
providing a heavy aromatic oil;
mixing said heavy aromatic oil with a polymer to provide an oil-polymer blend; and
mixing said sulfur-asphalt blend with said oil-polymer blend to provide said asphalt composition.

10. The method of claim 9, further comprising heating said asphalt to a temperature greater than 200° C. to provide a heated asphalt, and mixing said sulfur with said heated asphalt.

11. The method of claim 10, wherein said heating step comprises heating said asphalt to a temperature between about 220° C. and about 270° C.

12. The method of claim 10, further comprising cooling said sulfur-asphalt blend to a temperature less than or equal to 200° C. before mixing with said oil-polymer blend.

13. The method of claim 9, wherein said polymer is mixed with said heavy aromatic oil in an amount up to about 30% wt. based upon weight of said oil-polymer blend.

14. The method of claim 9, wherein said oil-polymer blend is mixed with said sulfur-asphalt blend in an amount between about 10% and about 30% wt. based upon weight of said asphalt composition.

15. The method of claim 9, wherein said step of mixing said oil-polymer blend with said sulfur-asphalt blend is carried out for a period of time sufficient to provide a substantially homogeneous dispersion of said polymer additive in said sulfur-asphalt blend.

16. The method of claim 9, wherein said polymer is SBS polymer.

17. The method of claim 9, wherein said sulfur is mixed with said asphalt in an amount between about 0.8% and about 10% wt based upon weight of said sulfur-asphalt blend.

* * * * *